United States Patent
Beer

[11] 3,951,560
[45] Apr. 20, 1976

[54] MAGNETOSTRICTIVE FASTENER ARRANGEMENT

[76] Inventor: Andrew E. Beer, 25 Sutton Place, New York, N.Y. 10022

[22] Filed: Apr. 30, 1974

[21] Appl. No.: 465,575

Related U.S. Application Data

[62] Division of Ser. No. 290,349, Sept. 19, 1972, Pat. No. 3,816,902.

[52] U.S. Cl. .............................. 403/273; 403/404
[51] Int. Cl.² ........................................ F16B 4/00
[58] Field of Search............. 403/DIG. 1, 273, 404; 285/381

[56] References Cited
UNITED STATES PATENTS

| 2,438,867 | 3/1948 | Rockwell et al. ............. 29/446 |
| 2,893,692 | 7/1959 | Marx ......................... 335/215 X |
| 3,222,771 | 12/1965 | Schwinghamer ............... 29/421 M |
| 3,345,732 | 10/1967 | Brower ....................... 29/421 M |
| 3,718,957 | 3/1973 | Shank ......................... 29/447 X |
| 3,816,902 | 6/1974 | Beer ........................... 403/273 X |

FOREIGN PATENTS OR APPLICATIONS

| 597,743 | 5/1960 | Canada ....................... 335/215 |

OTHER PUBLICATIONS

"Magnetostriction Phenomena" article in General Electric Review, Vol. 45, No. 3, pp. 161–163, Mar. 1942.

Primary Examiner—Andrew V. Kundrat
Attorney, Agent, or Firm—Brumbaugh, Graves, Donohue & Raymond

[57] ABSTRACT

Magnetostrictive fastener arrangement that relies upon the fractional change in length of a ferromagnetic element under the influence of a magnetic field (magnetostriction) to alter the physical cooperating relationship between the element and a second element. Each of the elements may exhibit the same or a different magnetostrictive effect in the presence of a magnetic field, and each of the elements is dimensioned so that a different physical relationship between the elements is achieved when either or both elements undergoes a fractional change in length.

10 Claims, 15 Drawing Figures

MAGNETOSTRICTIVE FASTENER ARRANGEMENT

This is a division of application Ser. No. 290,349, filed on Sept. 19, 1972, now U.S. Pat. No. 3,816,902.

BACKGROUND OF THE INVENTION

This invention relates to an improvement in fastening arrangements and more particularly, to magnetostrictive fasteners that utilize the principle of magnetostriction to provide enhanced holding action.

Fasteners, such as screws, nails, studs, rivets, nuts and bolts and the like are well known and extensively used to join materials together. Such fasteners tend to loosen, however, especially where the materials joined together undergo stresses and strains. Also, certain types of fasteners are subject to corrosion. Such corrosion action may cause the fastener to loosen because of the reduction in its size or, may make the fastener difficult to take apart which is necessary in the normal maintenance of machinery. Thermal expansion of metals has been utilized to provide long term tightfitting fasteners. For example, pipe connections are commonly made by joining preheated and precooled pipes. There are practical difficulties in applying the principle in other fastening arrangements. The heating equipment needed to provide the required temperature changes may be bulky and nonportable. Also, certain elements to be secured, such as large metal pieces, may not readily change their ambient temperature.

Therefore, a fastening arrangement that would fit tightly by changing dimensions at the time of assembly or disassembly while at the same time not requiring extensive, additional equipment would be a valuable advance in the art of fasteners.

SUMMARY OF THE INVENTION

There is provided in accordance with the present invention a fastener arrangement that overcomes the problems mentioned previously. More particularly, the invention relates to a fastening arrangement wherein at least one element of the fastener is at least partially made of a magnetostrictive material that undergoes shape changes in the presence of a magnetic field. Each of the elements is so dimensioned that a different physical relationship between the elements is implemented when either or both magnetostrictive elements undergoes a fractional change in length in the presence of a magnetic field of appropriate strength.

Where the fastener is a magnetostrictive screw, nail, stud, rivet, bolt, washer, electrical connector or the like, removal of the magnetic field after the fastener is in place causes an increase in the diameter of the fastener. The result is that the fastener fits more securely in the receiving holes in the elements to be held together. Thus, the fit is more snug than with conventional fasteners. The term fastener is meant to include any type of arrangement where parts may be made rigid with respect to each other. Also, a cotter pin may be made in part of a magnetostrictive material so that the application of a magnetic field causes the shaft of the pin to curve or be straight.

Corrosion may be reduced by fashioning the fastener of a magnetostrictive material that has less tendency to rust. More importantly, since the fit is more snug than conventional fasteners, there is less tendency for corrosion because oxygen has less surface area in which to oxidize. In addition, the usual difficulty in removing corroded fasteners is minimized by the use of magnetostrictive fasteners. To remove the fastener, a magnetic field is applied to thereby decrease the diameter of the fastener and thereby crack any corroded surface that may be present.

In another form of the invention the fastener may be a magnetostrictive chuck for holding a machine tool in place or alternatively, the tool itself may be made of a magnetostrictive material. Additionally, doors with magnetostrictive lining may be used to form a tight fitting fastening arrangement.

The additional equipment needed to cause the enhanced fastening action consists of a suitable source of a magnetic field. Either small permanent magnets or electromagnets may be used. In some cases the device used to insert the fastener into place, such as a screw driver or wrench, etc., may be modified so as to also incorporate the source of the magnetic field.

BRIEF DESCRIPTION OF THE DRAWINGS

For a better understanding of the invention, reference may be made to the following descriptions of the exemplary embodiments taken in conjunction with the following drawings in which:

FIG. 11b is a view of the machine tool and chuck taken along lines 11b of FIG. 11a;

In the following descriptions of illustrative embodiments of magnetostrictive devices arranged according to the present invention, all are based on the novel application of the principle of magnetostriction.

PRINCIPLES OF MAGNETOSTRICTION

Magnetostriction refers to the fractional change in length of a ferromagnetic body under the influence of a magnetic field. The three main kinds of magnetostriction are longitudinal magnetostriction, transverse magnetostriction and volume magnetostriction. Longitudinal magnetostriction may be either positive (Fe-Co Alloys) or negative (Ni & Co) or may be positive (elongate with increasing field) at low fields and negative for large fields. Transverse magnetostriction is measured orthogonally to the field and generally is equal to one half the longitudinal magnetostriction and of opposite sign. Volume magnetostriction is generally an order of magnitude smaller than longitudinal magnetostriction.

Figure 1:
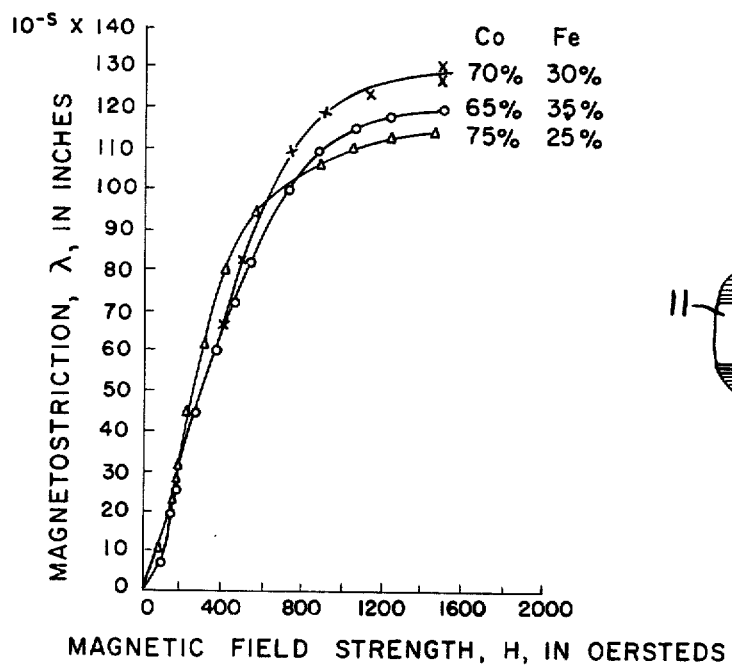
FIG. 1 is a graph showing properties of some magnetostrictive materials.

While all ferromagnetic materials have magnetostrictive qualities, the iron cobalt alloys (Fe-Co) appear to produce the greatest effect. The curves of FIG. 1 indicate magnetostriction as a function of field strength for three cold rolled Fe-Co alloys; for the Fe 30 - Co 70 alloy, the magnetostriction is $1.2 \times 10^{-4}$ in./in. at a field strength of 1000 oersteds. The thermal expansion for the same alloy for a 100°F. temperature change is $6 \times 10^{-4}$ in./in.

Since the greatest amount of magnetostriction occurs as the material approaches saturation, the magnet for producing the field must be capable of producing a large enough field. The magnetostrictive materials utilized in the present invention, such as the Fe-Co alloys, generally do not require more than 1000 oersteds to saturate them. When the alloys are not cold rolled, 200 oersteds may be sufficient. However, the shape of the magnetostrictive material, which determines the demagnetization factor, may necessitate the use of a much larger field to ensure the magnetostrictive material is near saturation.

Permanent magnets are suitable in most applications for generating the magnetic fields necessary to cause magnetostriction. Depending on the application of the magnetostrictive material, various shaped permanent magnets are available, such as horseshoe, bar, circular or rod, depending on the direction of the magnetic field required in relation to the structure of the magnetostrictive material. Ceramic magnets, such as barrium-ferrite, are readily available and provide field strengths from 2000 to 3000 oersteds. Also, Alnico permanent magnets provide the same range of field strength. In some applications it may be desirable to have higher field strengths. The rare earth cobalt alloy magnets, such as platinum cobalt, provide field strengths in excess of 3000 oersteds.

Most permanent magnets provide the previously mentioned field strengths in a relatively small volume of air. Therefore, where the magnetostrictive material is relatively large, electromagnets with or without an iron return circuit may be used. Air coils provide field strengths of the order of 1000 oersteds over a large volume. Where higher fields are desirable, electromagnets with an iron return circuit generate field strengths to 5000 oersteds in a one inch air gap. Electromagnets may be useful when the present invention is utilized in industrial applications.

PREFERRED EMBODIMENTS

Figure 2:
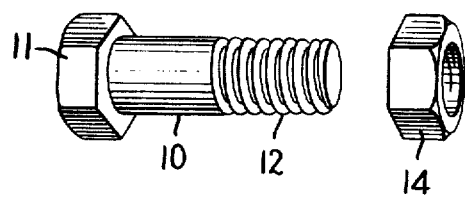
FIG. 2 is a schematic of a magnetostrictive nut and bolt combination arranged according to the present invention.

In the illustrative embodiment of a magnetostrictive fastening arrangement according to the present invention, as shown in FIG. 2, there is provided a nut and bolt combination for securing elements (not shown) together. In the drawing, a bolt 10 with a head 11 and external threads 12 and an internally threaded nut 14 are designed for engaging relationship. With conventional nut and bolt combinations, the inside diameter of the nut is somewhat larger than the outside diameter of the bolt so that the two may be readily joined together. Friction between the elements joined together and the bolt and nut respectively is relied upon to maintain a tight connection. However, in the present invention, the bolt 10 is made of a magnetostrictive material, such as a Fe-Co alloy, with an outside diameter that is approximately equal to the inside diameter of the bolt. In this condition the two may not be readily joined or if joined, separated.

A magnetic field is applied to the bolt 10 in a direction parallel to its axis when the combination is to be assembled or separated. This may be provided by an electromagnetic surrounding the bolt, a specially designed tool or, where appropriate, by a permanent magnet shaped as a horseshoe with one pole near the head 11 of the bolt 10 and the other pole near the nut 14. The magnetic field causes the length of the bolt to increase and the diameter to decrease about half the increase in length. After the combination is assembled and the field removed, the bolt 10 reassumes its original shape. The transverse magnetostriction, along the diameter, causes the nut and bolt to fit securely. In some applications it may be desirable to have the nut 14 made of a magnetostrictive material.

Figure 3:
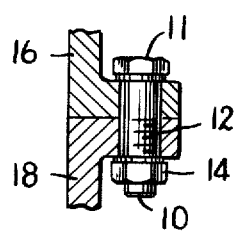
FIG. 3 is a sectional view of magnetostrictive nut and bolt in place arranged according to the present invention.

In FIG. 3, there is shown a sectional view of the bolt 10 and nut 14 holding a pair of elements 16 and 18 in place. Not only does transverse magnetostriction enhance the holding action, but also, longitudinal magnetostriction provides a tighter fit. Since the length of the bolt 10 increases when a magnetic field is present, the removal of the field after assembly causes the bolt 10 to decrease its length and thereby causes greater holding pressure to be exerted on the elements 16 and 18. Alternatively, the bolt 10 and the nut 14, instead of being formed with threads, may have smooth engaging surfaces.

Figure 4:
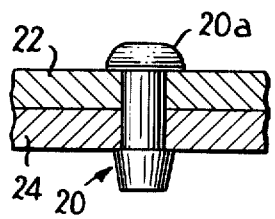
FIG. 4 is a sectional view of magnetostrictive rivet in place.

FIG. 4, indicates a magnetostrictive fastener in the form of a rivet 20. A pair of elements 22 and 24 with matching holes receive the rivet 20. The diameter of the rivet 20 is larger than the diameter of the holes of the members 22 and 24. A magnetic field, applied parallel to the length of the rivet 20, by a device similar to that described in FIG. 2, decreases the diameter so that it may be inserted into the bores in the elements 22 and 24. The head 20a is then formed on the rivet in the usual manner, and when the field is removed, the diameter of the rivet 20 increases while its length decreases, thereby to hold the elements 22 and 24 in tighter relationship.

Figure 5:
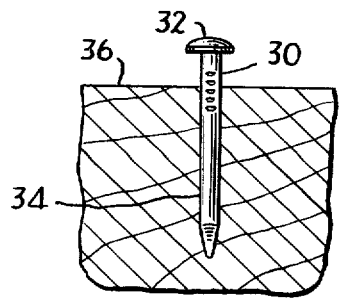
FIG. 5 is a sectional view of magnetostrictive nail in place.

As shown in FIG. 5, a nail 30 with a head 32 and a shaft 34 is made of a magnetostrictive material. When the nail 30 is to be driven into an element 36, such as wood, a magnetic field is provided parallel to the shaft of the nail 30, thereby decreasing the diameter of the nail. After the nail 30 is driven into the wood 36, the magnetic field is removed to increase the diameter of the nail 30.

Figure 6:
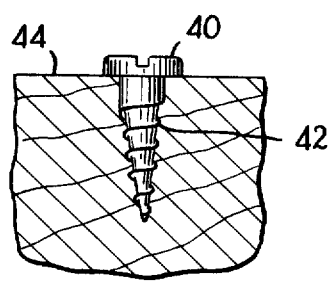
FIG. 6 is a sectional view of a magnetostrictive screw in place.

In similar manner, there is shown in FIG. 6 a magnetostrictive screw 40. The screw 40 with threads 42 is made of a magnetostrictive material and is shown seated in an element 44, such as wood or metal. The screw is inserted while the magnetic field is applied parallel to the shaft of the screw 40. The result of this action, again after the field has been removed, is that the screw fits more securely into the material 44 because of its increased diameter. The magnetostrictive screw 40, along with the other fastening arrangements, have the advantageous feature of facilitating their removal if any corrosion should accumulate on the fasteners over long time periods. The change in size of the fasteners can cause the corrosion, including rust, to break loose.

Figure 7:
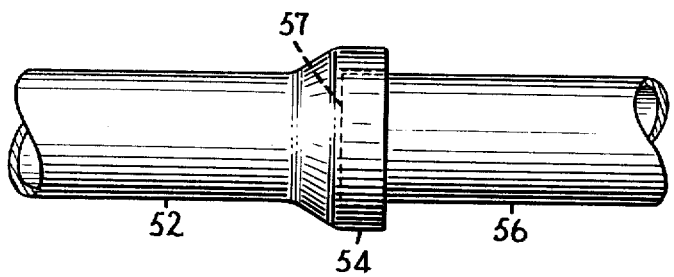
FIG. 7 is a view of a magnetostrictive pipe connection.

Referring to FIG. 7, there is shown an improved pipe connection arranged according to the present invention. A pipe 52 has a coupling section 54 adapted at one end to receive the end of another pipe 56. In the present invention, an end 57 of the pipe 56 is made of a magnetostrictive material with a diameter approximating the internal diameter of the coupling 54. When the pipes are to be fitted together, a magnetic field is applied parallel to the length of the pipe 56 which causes the end 57 of the pipe to contract, as shown in FIG. 7, so as to allow the pipe 56 to be inserted into the coupling 54. After the magnetic field is removed, the diameter of the end 57 of the pipe 56 increases to cause a tight fitting pipe connection.

Figure 8:
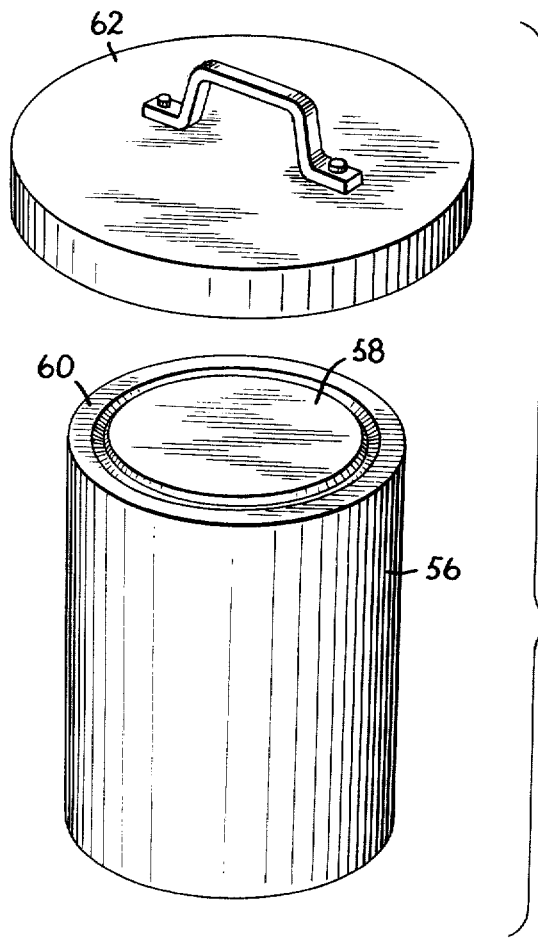
FIG. 8 is a magnetostrictive can arranged according to the present invention.

Referring now to FIG. 8, a can 56 has a top member 58 formed of magnetostrictive material frictionally secured within the recess of an interior lip 60 of the can. A permanent magnet 62 is located adjacent the top 58 to generate a magnetic field perpendicular to the surface of the top 58. The magnetic field causes the diameter of the top 58 to decrease thereby causing the top member 58 to separate from the lip 60. The top member 58 adheres to the magnet 62 after removal from the can 56.

Figure 9:
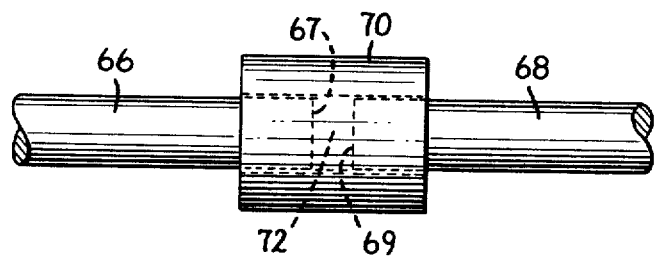
FIG. 9 is a magnetostrictive fitting arranged according to the present invention.

In a fitting arranged according to the present invention as shown in FIG. 9, a bar 66 is joined with another bar 68 by means of a fitting 70. Ends 67 and 69 of the bars 66 and 68, respectively, are made of a magnetostrictive material, and have a diameter slightly greater than inner diameter 72 of the fitting 70. When joining the rods 66 and 68, a magnetic field parallel to the axis of the rods causes the diameter of the ends 67 and 69 of the rods 66 and 68, respectively, to decrease, as shown in FIG. 9, so that the rods fit into the fitting 70. When the field is removed, the rods are held by the fitting 70.

Figure 10:
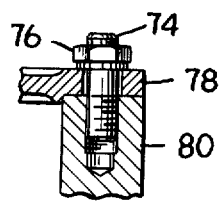
FIG. 10 is a sectional view of a magnetostrictive stud arranged according to the present invention.

Referring now to FIG. 10, a threaded stud 74 made of a magnetostrictive material is engaged with a nut 76 to hold the elements 78 and 80 together. The external threads of the stud 74 match the internal threads of the element 80. Similarly, as in the nut and bolt combination shown in FIG. 3, the holding action of the stud is enhanced by both longitudinal and transverse magnetostriction. Also, the stud 74, nut 76 and element 80 may be formed without threads.

Figure 11A:
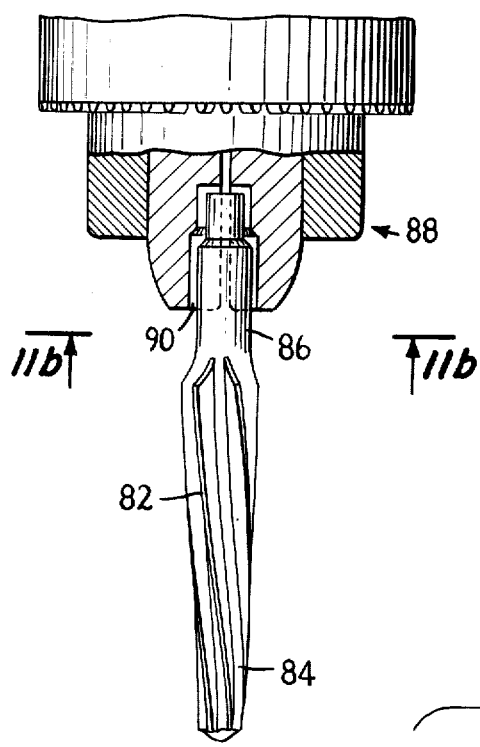
FIG. 11a is a partial sectional view of a machine tool held by a chuck arranged according to the present invention.
Figure 11B:
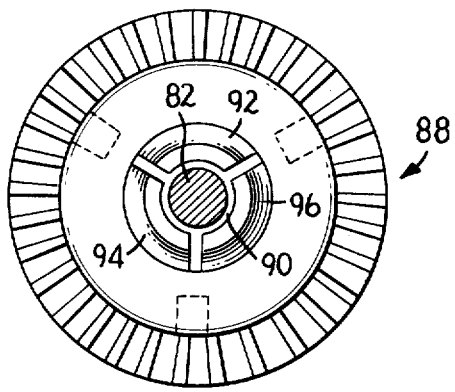

FIG. 11a and FIG. 11b show the application of the principle of magnetostriction to a chuck adapted to hold a machine tool. A machine tool 82, having a working end 84 and a securing end 86, is held by a chuck, represented generally by the reference numeral 88. In one manner of holding the tool 82 in place in the chuck 88, the securing end 86 is placed in a receiving hole 90 in the chuck 88 formed by a series of three arcuate adjustable chuck sections 92, 94 and 96. The inner edges of the sections 92, 94 and 96 form the receiving hole 90 and by conventional adjustment techniques (not shown) these sections may releasably grip the securing end 86 of the tool 82. The present invention may either supplement or eliminate the adjustment techniques.

In one form of the invention the sections 92, 94 and 96 are formed of a magnetostrictive material. Thus, when it is desired to insert the tool 82 into the chuck 88, a magnetic field, which may be provided by either a permanent magnet or electromagnet, is applied to the sections 92, 94 and 96 to cause them to alter their size and thereby increase the size of the receiving hole 90 to allow the securing end 86 to be inserted, as shown in FIG. 11a and FIG. 11b. The magnetic field is then removed which causes the sections to alter their dimensions so that they securely grip the tool 82. The sections may also be adapted to hold the tool when a magnetic field is applied to them and release the tool when the field is removed. In this form, it may be more suitable to have the field producing means be an appropriate electromagnet that is permanently affixed to the chuck. Control of the tool may then be accomplished by controlling electrical power to the electromagnet as with a switch.

In another form of the invention the securing end 86 of the tool 82 may be formed of a magnetostrictive material with the receiving hole 90 being of conventional design. To insert the tool 82 into the chuck 88 a magnetic field is applied to the securing end 86 to alter its dimensions to cause it to fit into the chuck. When the field is removed, the tool assumes its original shape which results in the tool being firmly held by the chuck.

Figure 12:
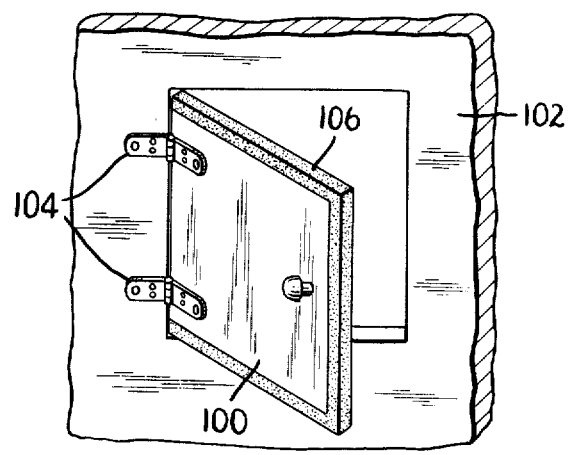
FIG. 12 is a view of a magnetostrictive door arranged according to the present invention.

Referring now to FIG. 12 a door 100 is mounted on a wall 102 by a pair of hinges 104. The shape of the door is not critical and may be square as shown, rectangular, or circular as with portholes on ships. Mounted around the perimeter of the door 100 is a strip 106 of magnetostrictive material. To close the door 100 a magnetic field is applied to the strip 106 to cause the strip to alter its size and thereby slightly decrease the overall perimeter of the door 100. The door 100 may then be swung into engagement with the wall 102. The removal of the magnetic field causes the strip 106 to assume its original dimensions which cause the door to fit snugly within the wall. In an alternative form of this embodiment, the strip 106 of magnetostrictive material may be placed along the edges of the opening in the wall 102. The tight fitting arrangement forms an excellent barrier for preventing leakage of water or air and thus is applicable for use in ships and space vehicles where tight fitting passageways are of utmost importance. The magnet may be portable or permanently mounted within either the door or wall.

Figure 13:
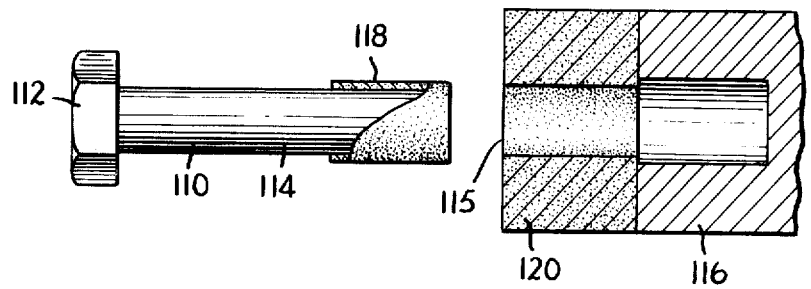
FIG. 13 is a view of a bolt and magnetostrictive washer arranged according to the present invention.

In FIG. 13 a bolt 110, having a head 112 and a shaft 114, is adapted to be inserted into an aperture 115 in a receiving member 116. A washer 118 made of a magnetostrictive material is rigidly mounted on the shaft 114 of the bolt 110 due to the magnetostrictive principle. An outermost portion 120 of the receiving part 116 is also made of a magnetostrictive material. To insert the bolt 110 into the aperture 115 of the receiving part 116 a magnetic field is applied to the washer 118 and the outermost part 120 which causes the magnetostrictive materials to alter their dimensions. Removing the magnetic field causes the magnetostrictive materials to assume their original dimensions, the result being that the washer 118 is too large to fit through the aperture formed by the outermost portion 120. Thus, the bolt is secured within the receiving part and may not be removed until a magnetic field is applied to the magnetostrictive material. In some applications it may be desirable to have only the washer 118 or only the outermost portion 120 made of a magnetostrictive material.

Figure 14:
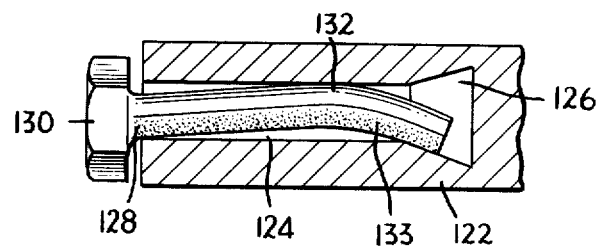
FIG. 14 is a view of a magnetostrictive cotter pin arranged according to the present invention.

Referring now to FIG. 14, a receiving part 122 has an aperture 124 with an outwardly flaring end section 126. A cotter pin 128 has a head 130, and a shaft 132 with section 133 of the shaft being made of a magnetostrictive material. The shaft 132 is curved as shown in FIG. 14 absent any magnetic field. By applying a magnetic field to the cotter pin, the shaft 132 becomes straight (not shown) whereby the pin may be removed from or inserted into the receiving part 122. Thus the curved shaft 132 in conjunction with the shape of the end section 126 of the aperture 124 causes the combination of the cotter pin 128 and receiving part 122 to be held in tight frictional relationship.

The present invention is applicable to increasing the frictional holding relationship between electrical connectors, such as electrical connectors that are inserted into switchboards. For instance, in FIG. 14 the cotter pin 128 may be an electrically conductive connector that may be inserted into the aperture 124 which may be a receiving hole on a switchboard. Similarly, the embodiments shown in FIG. 9 and FIG. 13 may be modified for use as electrical connectors.

The embodiments of the present invention described previously are intended to be merely exemplary and those skilled in the art will be able to make numerous variations and modifications without departing from the spirit of the present invention. All such variations and modifications are intended to be in the scope of the invention as defined in the appended claims.

I claim:

1. A magnetostrictive fastening system comprising a magnetostrictive element having at least one portion whose dimensions are adapted to be elastically changed in the presence of a magnetic field; receiving means for frictionally retaining said magnetostrictive element; and means for applying an external magnetic field to said magnetostrictive element so that said dimensions of said portion are altered within its elastic limit and said frictional relationship between said magnetostrictive element and said receiving means will be altered for fastening purposes.

2. The magnetostrictive fastening system according to claim 1, wherein the physical cooperating relationship is a frictional locking relationship formed in the absence of the magnetic field.

3. The magnetostrictive fastening system according to claim 1, wherein the physical cooperating relationship is a frictional locking relationship formed in the presence of the magnetic field.

4. The magnetostrictive fastening system according to claim 1, wherein the magnetostrictive element comprises a nail adapted to be driven into and engage the receiving means in the presence of the magnetic field, the diameter of the nail decreasing in length when the magnetic field is applied parallel to the axis of the nail, whereby the diameter of the nail increases in the absence of the magnetic field to provide a greater frictional locking relationship between the nail and the receiving means.

5. The magnetostrictive fastening system according to claim 1, wherein the magnetostrictive element comprises a screw adapted to be driven into and engage the receiving means in the presence of a magnetic field, the diameter of the screw decreasing when the magnetic field is applied parallel to the axis of the screw, whereby the diameter of the screw increases in the absence of the magnetic field to provide a greater frictional locking relationship between the screw and the receiving means.

6. The magnetostrictive fastening system according to claim 1 wherein the magnetostrictive element comprises a wall with an opening having a lining made of magnetostrictive material and the receiving means comprises a door, the size of the opening increasing when the magnetic field is applied to the lining, whereby the opening decreases in the absence of the magnetic field to provide a greater frictional locking relationship between the door and the wall.

7. The magnetostrictive fastening system according to claim 1, wherein the magnetostrictive element comprises a stud adapted to be inserted into and engage the receiving means in the presence of the magnetic field, the diameter of the stud decreasing when the magnetic field is applied generally parallel to the axis of the stud, whereby the diameter of the stud increases in the absence of the magnetic field to provide a greater frictional locking relationship between the stud and the receiving means.

8. The magnetostrictive fastening system according to claim 1, wherein the magnetostrictive element comprises a pipe adapted to be inserted into another pipe having receiving means comprising a coupling section, the diameter of the pipe decreasing when the magnetic field is applied parallel to the axis of the pipe whereby the diameter of the pipe increases in the absence of the magnetic field to provide a greater frictional locking relationship between the pipes.

9. The magnetostrictive fastening system according to claim 1 wherein the magnetostrictive element comprises at least one bar and the receiving means comprises a fitting, the bar adapted to engage the fitting in the presence of the magnetic field, the diameter of the bar decreasing when the magnetic field is applied parallel to the axis of the bar, whereby the diameter of the bar increases in the absence of the magnetic field to provide a greater frictional locking relationship between the fitting and the bar.

10. The magnetostrictive fastening system according to claim 1 wherein the magnetostrictive element comprises a door having a lining made of magnetostrictive material formed around the perimeter of the door and the receiving means comprises a wall having an opening for the door, the size of the door decreasing when the magnetic field is applied to the door, whereby the size of the door increases in the absence of the magnetic field to provide a greater frictional locking relationship between the door and the wall.

* * * * *